United States Patent [19]

Akada

[11] Patent Number: 4,958,299
[45] Date of Patent: Sep. 18, 1990

[54] CONTROL DEVICE FOR USE WITH A DRAWING OUTPUT UNIT

[75] Inventor: Yukihisa Akada, Iwatsuki, Japan

[73] Assignee: Fuji Xerox Co., Ltd., Tokyo, Japan

[21] Appl. No.: 294,267

[22] Filed: Jan. 6, 1989

[30] Foreign Application Priority Data

Jun. 13, 1988 [JP] Japan ................................ 63-145506

[51] Int. Cl.$^5$ .............................................. G06F 3/14
[52] U.S. Cl. .................................. 364/520; 346/153.1; 355/40; 364/518
[58] Field of Search .............................. 364/519, 520; 346/153.1, 157, 160, 160.1; 355/40

[56] References Cited

U.S. PATENT DOCUMENTS 4,722,064 1/1988 Suzuki .................................. 364/518

Primary Examiner—Gary V. Harkcom
Assistant Examiner—H. R. Herndon
Attorney, Agent, or Firm—Spensley Horn Jubas & Lubitz

[57] ABSTRACT

A control device for use with a drawing output unit, which selects from a plurality of image data stored in an image memory, corresponding to a set of drawings of various sizes, image data of a set of drawings whose size matches an output size of paper present in the drawing output unit, and preferentially transfers the selected image data from the image memory to the drawing output unit.

11 Claims, 4 Drawing Sheets

CONTROL DEVICE FOR USE WITH A DRAWING OUTPUT UNIT

BACKGROUND OF THE INVENTION

The present invention generally relates to a control device in use with an image recording apparatus, and more particularly, to a control device in use with an image recording apparatus for causing the image recording apparatus to output graphic data as generated by a computer, e.g., a host computer.

The image recording apparatus, which visually outputs an image of the graphic data (vector data) as is generated by a computer generating and supplying graphic data, e.g., a host computer, comes in two varieties, an electrostatic plotter and a called Xerography plotter.

The electrostatic plotter directly forms an electrostatic latent image on an electrostatic recording paper by a recording head of the multi-needle electrode type, and applies a subsequent developing process to the latent image, and finally produces an image in a visual manner. The Xerography plotter (referred to as an XP plotter) forms an electrostatic latent image on a photosensitive drum, and transforms the latent image into a visible image, and finally transfers it on normal paper.

Some types of the image recording apparatuses use recording papers of some different sizes in accordance with the sizes of the set-of-drawings, which is output for the input image data (an XP plotter of this type is provided with a plurality of trays containing papers of different sizes, and for outputting a drawing of the image data, a tray corresponding to the size of the set-of-drawings is selected and the image data is output onto the paper in the selected tray).

In a conventional control device in use with the above image recording apparatus, the graphic data (vector data) as is generated by and transferred from a host computer is converted into raster image data. When the image recording apparatus is ready for the outputting of the image data, the converted image data is transferred to the image recording apparatus, and the image (visible output) is output from the image recording apparatus. When the image recording apparatus is not in a ready-for-drawings-output state, viz., when the paper of a size amounting to an image size of the image data of a set of drawings (referred to as set-of-drawings size paper), is absent, the transfer of the image data is ceased till the image recording apparatus is in a ready-for-drawings-output state (viz., the supply of the set-of-drawings size paper is completed). When the image recording apparatus is in a ready-for-drawings-output state, the image data is transferred to the image recording apparatus, the image (visible output) is output from the image recording apparatus.

In transferring the image data of the set of drawings to the image recording apparatus, when the set-of-drawings size paper is absent, the conventional control device decides that the image recording apparatus cannot output a drawing, and ceases the transfer of the image data. At this time, it is assumed that the host computer generates the image data of another set of drawings and when the paper of a size amounting to the generated image data is present in the image recording apparatus. In this case, the paper of the output size corresponding to the additional image data should be present in the image recording apparatus. Therefore, although the image recording apparatus can output the drawing of the image data corresponding to the additional image data, it does not execute the output processing of the next generated image data until the output processing of the previously transferred image data is completed, viz., the supply of the paper whose size amounts to the previously generated image data is completed, and the output processing of the previously transferred image data is completed. Therefore, much time is taken for the image outputting operation.

Additionally, the host computer must retain the next generated image data of the set of drawings till the outputting of the previously generated and transferred image data of the set of drawings is completed. During this time period, the host computer is inhibited from engaging in other jobs, resulting in poor rate of operation of the host computer.

SUMMARY OF THE INVENTION

Accordingly, an object of the present invention is to provide a control device in use with an image recording apparatus which visually outputs the image data at a high speed, and improves a rate of operation of the host computer.

To achieve the above object, there is provided a control device in use with an image recording apparatus comprising: image storing means for storing a plurality of image data of a set of drawings into predetermined memory areas in accordance with output sizes of the image data; storing means for storing memory locations of the plurality of the set-of-drawings image data as stored in the image storing means and the output sizes of the image data; input control means for storing the image data of the set of drawings into the image storing means in accordance with the output sizes, and for storing the memory locations of the plurality of image data of the set of drawings and the output sizes into the storing means; and output control means, the output control means reading out of the storing means the memory locations of the image data of the set of drawings and the output sizes, when the paper of the read out size is absent in the image recording apparatus, the output control means ceasing the transfer of the read output image data of the set of drawings to the image recording apparatus, when the paper of the size corresponding to the size of another image data of the set of drawings as stored in the storing means is present in the image recording apparatus, the output control means selecting the additional image data of the set-of-drawings corresponding to that paper, and transferring the selected graphic data of a set of drawings from the image storing means to the image recording apparatus; wherein of the plurality of the image data of the set-of-drawings stored in the image storing means, the image data whose size matches the size of the paper present in the image recording apparatus is preferentially transferred from the image storing means to the image recording apparatus.

Other objects and features of the present invention will be apparent when carefully reading the detailed description of the invention in connection with the accompanying drawings, in which:

DETAILED DESCRIPTION OF THE PREFERRED EMBODIMENTS

An embodiment of a control device according to the present invention will be described with reference to the accompanying drawings.

Figure 2:
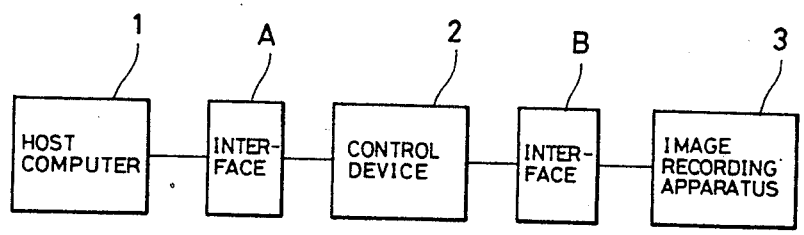
FIG. 2 is a block diagram of an image recording apparatus incorporating a control device according to the present invention.

FIG. 2 shows in block form an image recording system incorporating a control device according to the present invention.

The graphic data (vector data) as is generated and transferred by a host computer 1, is converted into raster image data by a control device 2 according to the present invention. The converted image data is transferred to an image recording apparatus 3 with a plurality of trays containing cut paper of different sizes. The image recording apparatus 3 may be an XP plotter. The image recording apparatus 3 then outputs an image (visible output) visually. In FIG. 2, reference symbols A and B show physical I/O interfaces, respectively.

Figure 1:
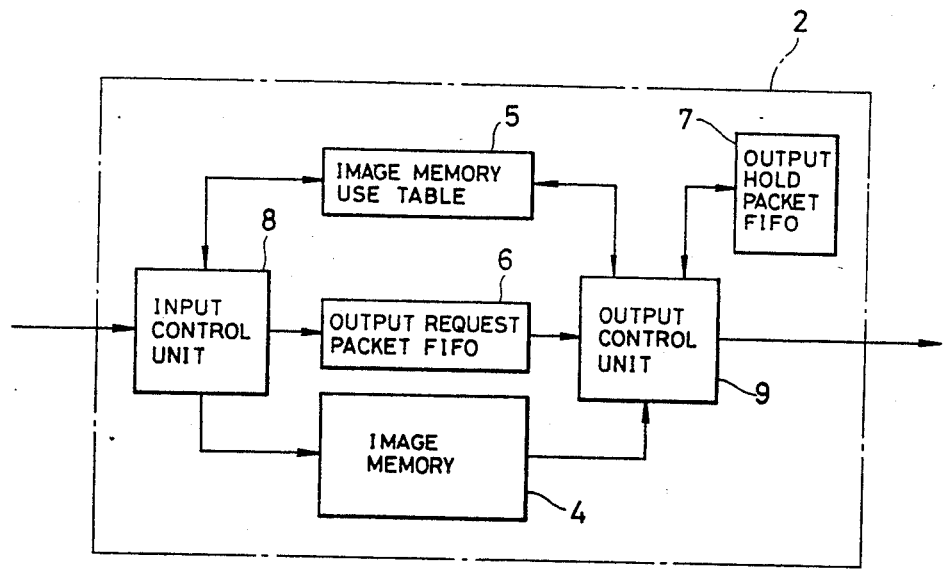
FIG. 1 is a block diagram showing a control device according to the present invention.

The control device 2 is made up of an image memory 4, an image memory use table 5, memory units FIFO 6 and FIFO 7, an input control unit 8, and an output control unit 9, shown by a block diagram of FIG. 1. The image memory 4 is an image storing means for storing a plurality of image data of a set of drawings in accordance with the output sizes of the image data. The image memory use table 5 is a memory for indicating the memory locations of the image data of the set of drawings in the image memory 4. The memory units FIFO 6 and FIFO 7 are memories for storing in a packet form the output sizes of the set-of-drawings image data stored in the image memory 4, the memory locations of the used image data, and the like. The FIFO 6 is for output request packet, and the FIFO 7 for output hold packet. The input control unit 8 converts the graphic data of the data as transferred from the host computer 1, into raster image data, stores the converted image data into predetermined memory locations of the image memory 4 according to the size of the output drawings as the converted image data visually output, marks the image memory use table 5 corresponding to the memory locations of the image memory 4, and writes in a packet form into the output request packet FIFO 6 the output sizes of the set-of-drawings image data stored in the predetermined memory locations of the image memory 4, the used image memory locations, and the like. The output control unit 9 is an output control means which reads out the packet from the output request packet FIFO 6, and reads out the image data of the set of drawings from the memory location of the image memory 4 as is designated by the read out packet. When the paper of the size matching the read out image data of the set-of-drawings is absent in the image recording apparatus 3, the output control unit writes the packet read out of the output request packet FIFO 6 into the output hold packet FIFO 7. The image memory use table 5, output request packet FIFO 6, and output hold packet FIFO 7 make up a storing means for storing the memory locations of the image data and the output sizes of the image data.

The elements in the image memory use table 5 respectively correspond to the areas of the image memory 4. Incidentally, the image memory is segmented into areas each of a specific size (referred to as a unit). The table 5 marks its elements for indicating whether the regions of the image memory 4 are used or not. For example, "1" is set in the element of the table 5 corresponding to the now used region of the table 5, and "0" in the element corresponding to the region currently not used.

The input control unit 8 and the output control unit 9 are each made up of a peripheral circuitry mainly including a CPU (Central Processing Unit). The image memory 4 may be a RAM. The memories FIFOs 6 and 7 are memories based on the fast-in and fast-out.

The operation of the control device 4 will be described with reference to FIGS. 1 through 5.

Figure 3:
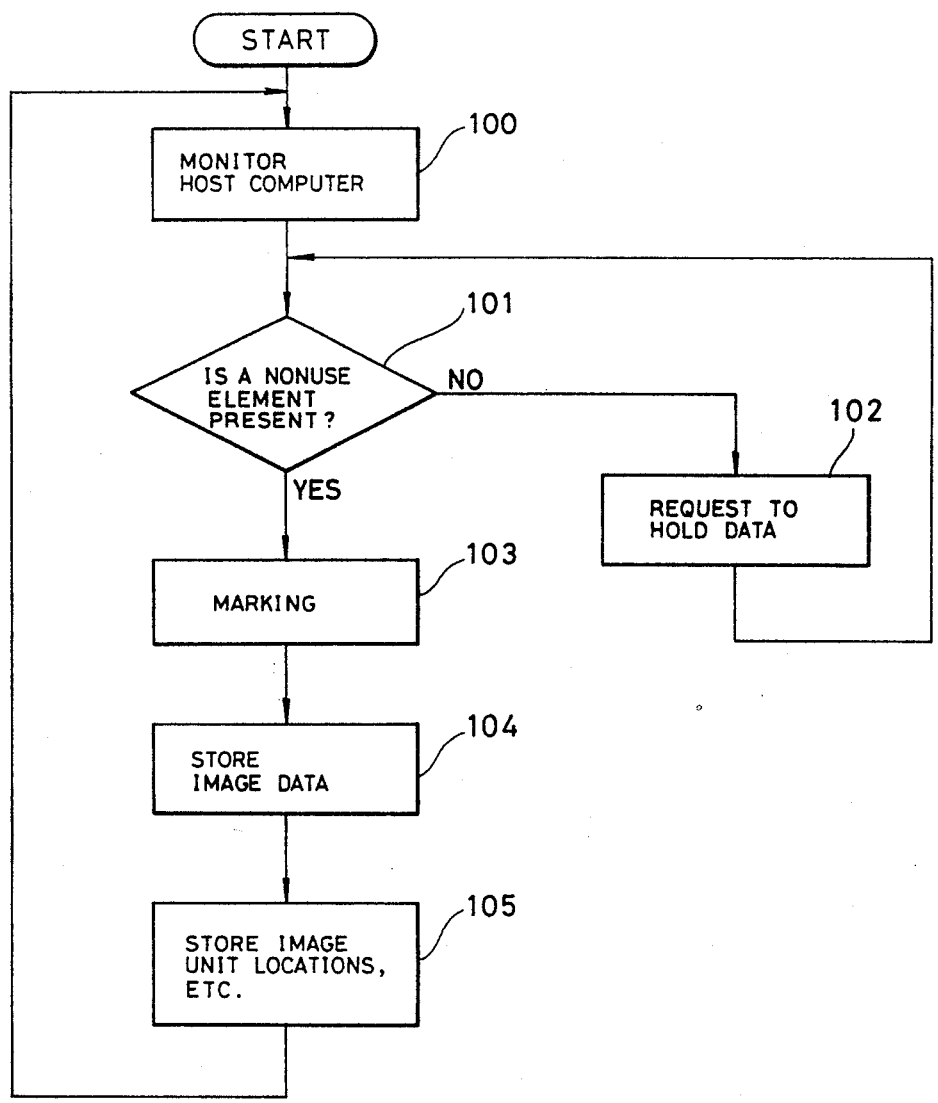
FIG. 3 is a flowchart showing a sequence of operations of an input control unit in a control device according to the present invention.
Figure 5:
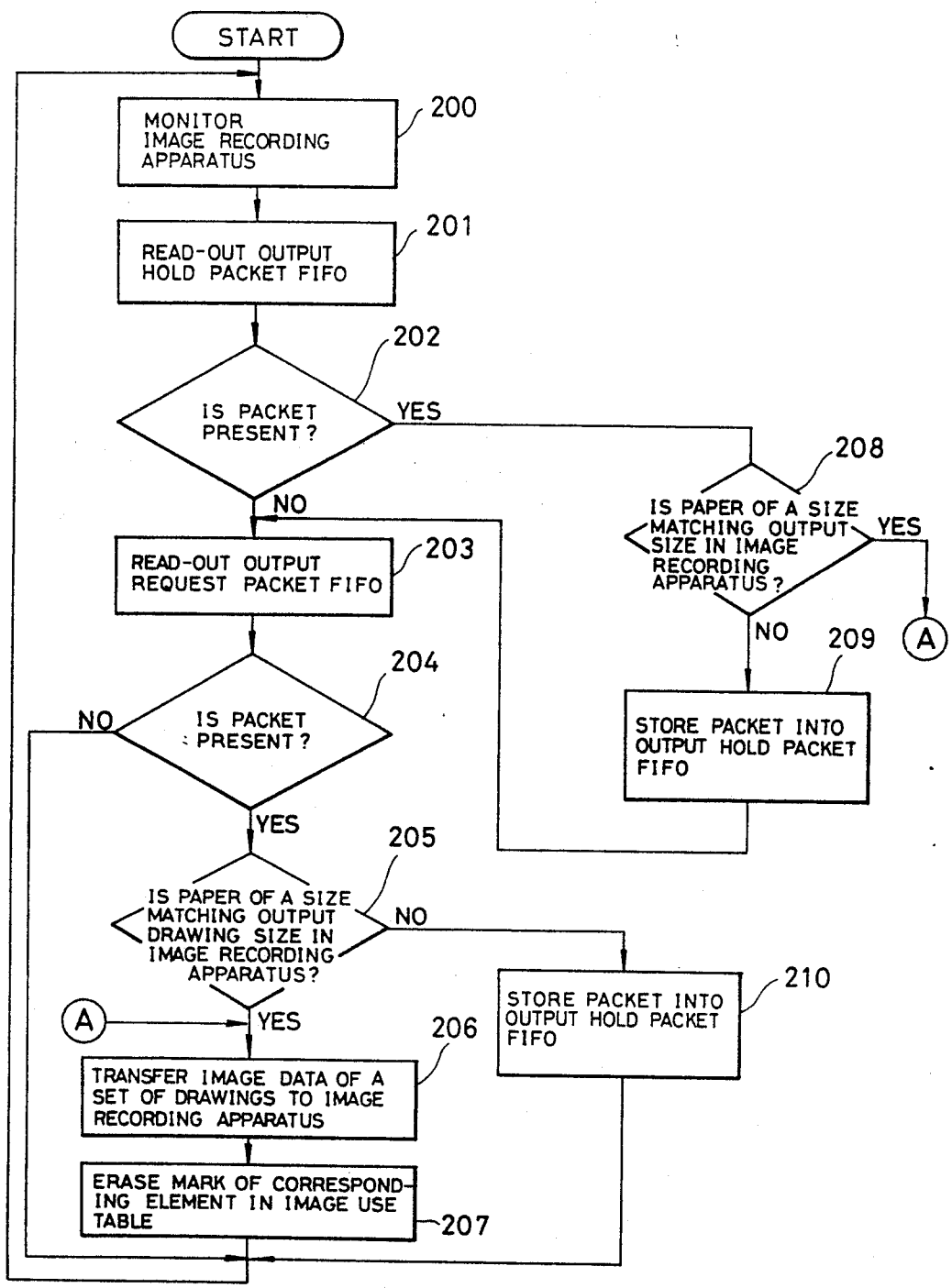
FIG. 5 is a flowchart showing a sequence of operations of an output control unit in a control device according to the present invention.

FIG. 3 is a flowchart charting a flow of control operation by the input control unit 8 of the control device 2, and FIG. 5 is a flowchart charting a control flow by the output control unit 9.

In FIG. 3, the input control unit 8 monitors the host computer 1 (Step 100). When it receives the data from the host computer 1 (graphic data, and data concerning the output control of the image recording apparatus 3), it checks whether or not the image memory use table 5 contains the nonuse element (Step 101) (in other words, it searches if there is a region now not used in the image memory 4, viz., into which new data may be stored), on the basis of the data relating to the output control of the image recording apparatus 3 (data of the size of the set-of-drawings), which is contained in the data from the host computer. If no nonuse element is contained, the input control unit requests the host computer 1 to hold the data (Step 102). Then, the input control unit 8 returns to the step to check whether or not the image memory use table 5 contains the nonuse element (Step 101).

When a nonuse element exists in the image memory use table 5 in Step 101, the input control unit 8 marks the corresponding element, i.e., the nonuse element, of the table 5, viz., sets "1", for example, in that element (Step 103), and stores the image data of the set of drawings as converted into raster image data, into the memory region in the image memory 4, which corresponds to the nonuse element in the image use table 5 (Step 104). After the set-of-drawings image data is stored into the specific memory area of the image memory 4, the input control unit 8 stores into the output request packet FIFO 6, an image use start unit location and an image use end unit location in the image memory 4, and additional data (including output size, the output number of sheets of paper and the like) (Step 105).

Figure 4:
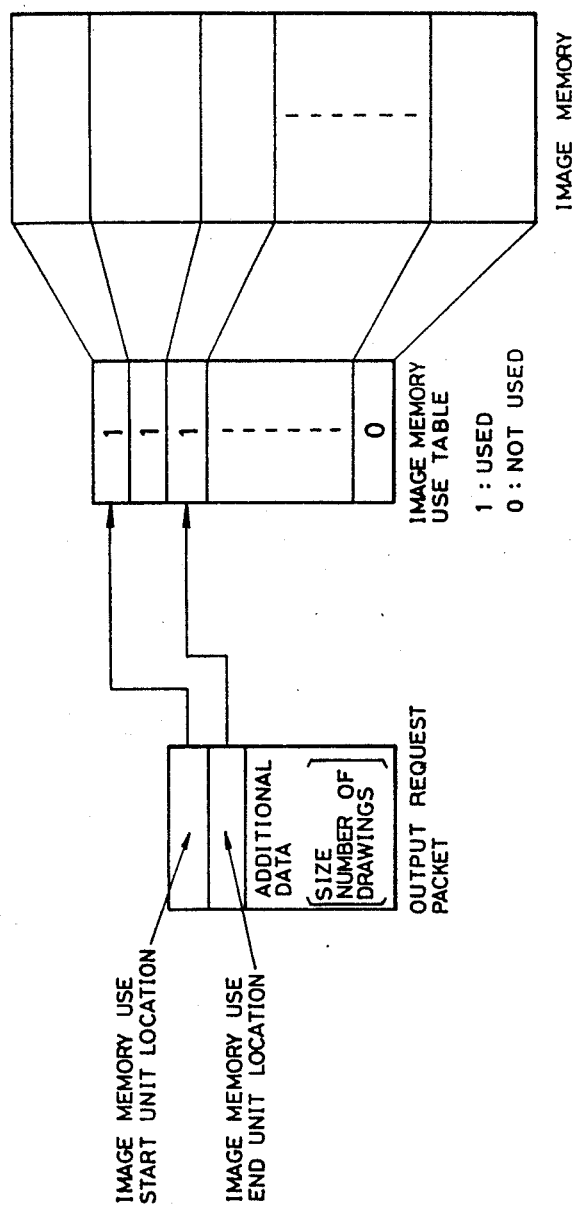
FIG. 4 is a view showing a relationship among output request packet FIFO, image memory use table, and an image memory storing data at the respective memory locations.

After the image use start unit location and the like are stored into the FIFO 6, the input control unit 8 returns to the monitoring step for monitoring the host computer 1 in Step 100. A relationship among the data stored in the FIFO 6, table 5, and image memory 4 is shown in FIG. 4.

The output control unit 9, as shown in a flowchart of FIG. 5, is in a monitor mode for monitoring the conditions of the image recording apparatus 3 (Step 200) (for example, read state/not ready state of the recording apparatus 3, presence or absence of the paper in each tray used, and the size of the paper contained in the tray). Subsequently, the output control unit reads out the packet from output hold packet FIFO 7 (Step 201), checks if the packet is present in FIFO 7 (Step 202), and if no packet is present in FIFO 7, then it reads out the packet from the output request packet FIFO 6 (Step 203). And it checks if the packet is present in FIFO 6 (Step 204), and if it is present, the output control unit checks if the paper of the size matching that of the set-of-drawings is present in the image recording apparatus 3 by using the read out packet (Step 205). When the paper of such a size is present, the output control unit 9 reads out the set-of-drawings image data from the location in the image memory 4 as specified by the data of FIFO 6, and transfers it to the image recording apparatus 3 (Step 206). Following this, it erases from the packet data, the mark (viz., changes "1" to "0") in the element in the image use table 5, which corresponds to the memory location storing the corresponding image data (Step 207). Under this condition, the input control unit 8 is allowed to store the next graphic data transferred from the host computer 1, into a specific region in the image memory 4. Then, the output control unit 9 returns to the monitoring mode for monitoring the conditions of the image recording apparatus 3 in Step 200.

When the output control unit 9, in Step 202, decides that the packet is present in the output hold packet FIFO 7, it checks on the basis of the additional data read out from the packet, if the paper of the set-of-drawings size is present in the image recording apparatus 3 (Step 208).

When the control unit 9 decides that the paper of such a size is present, it traces a sequence of control processings from Step 206 and the subsequent ones.

When the control unit 9 decides in Step 208 that the paper of such a size is absent, it loads again the data in the packet which is read out from FIFO 7, into the same FIFO 7 (Step 209). Subsequently, the control unit 9 traces the sequence of control processings from Step 203 and the subsequent ones.

When the control unit 9 judges in Step 205 that the paper is not present in the image recording apparatus 3, it stores the read out packet into the output hold packet FIFO 7 (Step 207), and it returns to the monitoring mode for the image recording apparatus 3 as is indicated by Step 200.

As seen from the foregoing description, the control device 2 according to the present invention may concurrently perform two different operations, to convert the graphic data from the host computer 1, into image data by the input control unit, and to transfer the image data already converted and stored by the output control unit 9, to the image recording apparatus 3. Therefore, it is not necessary that the host computer 1 holds the next generated drawing till the processing of the data the previously transferred graphic data is completed. When the paper of the size matching the image data stored in the image memory 4 has been supplied to the image recording apparatus 3, the control device 2 preferentially reads out the output hold packet FIFO 7, and sequentially outputs the image data stored in the image memory 4. This feature speeds up the outputting of drawings.

As described above, in a control device in use with an image recording apparatus, if the paper of the size matching the image data to now be output is absent in the image recording apparatus, another image data of a set of drawings whose size matches the paper present in the image recording apparatus, is selected and preferentially output. Therefore, the drawings may smoothly be output, thus improving a speed of the outputting of drawings of the image recording apparatus. The host computer may sequentially output the generated graphic data, so that there is no need for holding the next generated graphic data by the host computer till the previously generated graphic data is output. Therefore, after the graphic data are generated, the host computer may engage in another job, resulting in the effective use of the host computer.

Having described a specific embodiment of our bearing, it should be understood that the present invention may variously be changed and modified within the spirit and scope as set forth in the appended claims. It is further understood that the variations and modifications within the equivalents of the invention as defined in the claims are also within the spirit and scope of the invention.

What is claimed is:

1. A control device for use with a drawing output unit for controlling the outputting of drawings, comprising:

image storing means for storing a plurality of image data of a set of drawings into predetermined memory areas in accordance with output sizes of the image data;

storing means for storing data indicative of memory locations and output sizes of each of the plurality of the image data of the set-of-drawings stored in the image storing means;

input control means for controlling the storing of the image data of the set of drawings into the predetermined memory areas of the image storing means in accordance with the output sizes, and for controlling the storing of the data indicative of the memory locations and the output sizes of each of the plurality of the image data of the set of drawings into the storing means; and output control means for controlling the reading out of the data indicative of the memory locations and the output sizes of the plurality of the image data of the set of drawings from the storing means, and when papers of a size corresponding to the read out size are absent in the drawing output unit, the output control means temporarily ceasing the transfer of the read out image data of the set of drawings to the drawing output unit, while selecting from among the read out data of the output sizes another image data of a set-of-drawings of an output size corresponding to an output size that the drawing output unit can output and controlling the transfer of the selected image data of the set of drawings from the image storing means to the drawing output unit.

2. The control device according to claim 1, wherein the drawing output unit is an electrostatic plotter provided with a plurality of trays containing cut papers of different sizes corresponding to the output sizes of the image data of the set of drawings.

3. The control device according to claim 1, wherein the drawing output unit is a Xerography plotter provided with a plurality of trays containing cut papers of different sizes corresponding to the output sizes of the image data of the set of drawings.

4. The control device according to claim 1, wherein the storing means comprises an image memory use table memory for storing indices indicating whether or not the image data of the set of drawings are stored in the predetermined memory areas in the image storing means, and an output request packet memory and an output hold packet memory for storing the output sizes of the image data stored in the image storing means, use image memory locations, and the like, in a packet form.

5. A control device in use with an image recording apparatus, in which said control device outputs image data generated by a computer to said image recording apparatus, comprising:

image data storing means for storing a plurality of image data of a set of drawings into predetermined memory areas in accordance with output sizes of image data;

storing means includes an image memory use table memory for indicating memory locations of the image data of the set of drawings in said image storing means, and an output request packet memory and an output hold packet memory for the output sizes of image data stored in said image storing means, a use image memory location, and the like, in a packet form;

input control means converts graphic image of a set of drawings, which is contained in data transferred from said computer, into raster image data, stores the converted image data of the set of drawings into a predetermined memory location of said image storing means in accordance with output sizes of the converted imaged data, and marks a memory location of said image memory use table memory, which corresponds to the memory location in said image storing means, and writes the output size of the image data of the set of drawings stored in said image storing means, a use image memory location, and the like, into said output request packet memory in a packet form; and output control means reads out a packet from said output hold packet memory, when the paper of a size matching the output image data of the set of drawings as specified by said packet is present in said image recording apparatus, said output control means reads out the image data of the set of drawings from the memory area of said image storing means as specified by said packet, and transfers it to said image recording apparatus, when the paper of a size matching the output image data of the set of drawings as specified by a packet read out from said output hold packet memory is absent in said image recording apparatus, said output control means reads out a packet from said output request packet memory, when the paper of a size matching the output image data of the set of drawings as specified by said packet is present in said image recording apparatus, said output control means reads out the image data of the set of drawings from the memory area of said image storing means as specified by said packet, and transfers it to said image recording apparatus, and when the paper of a size matching the output image data of the set of drawings as specified by the packet read out from said output request packet memory is absent in said image recording apparatus, said output control means writes said packet read out from said output request packet memory, into said output hold packet memory.

6. The control device according to claim 5, wherein said image recording apparatus is an electrostatic plotter provided with a plurality of trays containing cut papers of different sizes in accordance with output sizes of image data of a set of drawings.

7. The control device according to claim 5, wherein said image recording apparatus is a Xerography plotter provided with a plurality of trays containing cut papers of different sizes in accordance with output sizes of image data of a set of drawings.

8. The control device according to claim 5, wherein said output request packet memory and said output hold packet memory are of the first-in first-out type.

9. A control device for use with a drawing output unit for controlling the outputting of drawings, comprising:

image storing means for storing a plurality of image data of a set of drawings into predetermined memory areas in accordance with output sizes of the image data;

storing means for storing data indicative of memory locations and output sizes of each of the plurality of the image data of the set of drawings stored in the image storing means, the storing means comprising an image memory use table memory for storing indices indicating whether or not the image data of the set of drawings are stored in the predetermined memory areas in the image storing means, and an output request packet memory and an output hold packet memory for storing the output sizes the image data stored in the image storing means, use image memory locations, and the like, in a packet form, the output request packet memory and the output hold packet memory being of first-in first-out type memories;

input control means for controlling the storing of the image data of the set of drawings into the predetermined memory areas of the image storing means in accordance with the output sizes, and for controlling the storing of the data indicative of the memory locations and the output sizes of each of the plurality of the image data of the set of drawings into the storing means; and output control means for controlling the reading out of the data indicative of the memory locations and the output sizes of the plurality of the image data of the set of drawings from the storing means, and when papers of a size corresponding to the read out size are absent in the drawing output unit, the output control means temporarily ceasing the transfer of the read out image data of the set of drawings to the drawing output unit, while selecting from among the read out data of the output sizes another image data of a set of drawings of an output size corresponding to an output size that the drawing output unit can output and controlling the transfer of the selected image data of the set of drawings from the image storing means to the drawing output unit.

10. A control device for use with a drawing output unit for controlling the outputting of drawings, comprising:

image storing means for storing a plurality of image data of a set of drawings into predetermined memory areas in accordance with output sizes of the image data;

storing means for storing data indicative of memory locations and output sizes of each of the plurality of the image data of the set of drawings stored in the image storing means, the storing means comprising an image memory use table memory for storing indices indicating whether or not the image data of the set of drawings are stored in the predetermined memory areas in the image storing means, and an output request packet memory and a output hold packet memory for storing the output sizes of the image data stored in the image storing means, use image memory locations, and the like, in a packet form;

input control means for controlling the storing of the image data of the set of drawings into the predetermined memory areas of the image storing means in accordance with the output sizes, and for controlling the storing of the data indicative of the memory locations and the output sizes of each of the plurality of the image data of the set of drawings into the storing means, the input control means marking a memory location of the image memory use table memory, which corresponds to a memory location in the image storing means into which the image data of the set of drawings is stored in accordance with the output size, and writing the output sizes of the image data of the set of drawings, use image memory locations, and the like into the image storing means, in a packet form; and output control means for controlling the reading out of the data indicative of the memory locations and the output sizes of the plurality of the image data of the set of drawings from the storing means, and when papers of a size corresponding to the read out size are absent in the drawing output unit, the output control means temporarily ceasing the transfer of the read out image data of the set of drawings to the drawing output unit, while selecting from among the read out data of the output sizes another image data of a set of drawings of an output size corresponding to an output size that the drawing output unit can output and controlling the transfer of the selected image data of the set of drawings from the image storing means to the drawing output unit.

11. A control device for use with a drawing output unit for controlling the outputting of drawings, comprising:

image storing means for storing a plurality of image data of a set of drawings into predetermined memory areas in accordance with output sizes of the image data;

storing means for storing data indicative of memory locations and output sizes of each of the plurality of the image data of the set of drawings stored in the image storing means, the storing means comprising an image memory use table memory for storing indices indicating whether or not the image data of the set of drawings are stored in the predetermined memory areas in the image storing means, and an output request packet memory and an output hold packet memory for storing the output sizes of the image data stored in the image storing means, use image memory locations, and the like, in a packet form;

input control means for controlling the storing of the image data of the set of drawings into the predetermined memory areas of the image storing means in accordance with the output sizes, and for controlling the storing of the data indicative of the memory locations and the output sizes of each of the plurality of the image data of the set of drawings into the storing means; and output control means for controlling the reading out of the data indicative of the memory locations and the output sizes of the plurality of the image data of the set of drawings from the storing means, and when papers of a size corresponding to the read out size are absent in the drawing output unit, the output control means temporarily ceasing the transfer of the read out image data of the set of drawings to the drawing output unit, while selecting from among the read out data of the output sizes another image data of a set of drawings of an output size corresponding to an output size that the drawing output unit can output and controlling the transfer of the selected image data of the set of drawings from the image storing means to the drawing output unit, the output control means controlling the reading of a packet from the output hold packet memory, when papers of a size matching with an output size of the image data of a set of drawings as specified by the read out packet are present in the drawing output unit, the output control means controlling the reading out of the image data of the set of drawings from a memory location of the image storing means as specified by the read out packet and controlling the transfer of the read out data to the drawing output unit, and when papers of the size matching with the output size of the image data of the set of drawings as specified by the read out packet are absent in the drawing output unit, controlling the reading out of a packet from the output request packet memory, when the papers of the size corresponding to the output size of the image data of the set of drawings as specified by the packet read out from the output request packet memory is present in the drawing output unit, controlling the reading out of the image date of the set of drawings from a memory location of the image storing means as specified by the packet read out from the output request packet memory and controlling the transfer of the read out image data to the drawing output unit, and when the papers of the size corresponding to the output size of the image data of the set of drawings as specified by the packet read out from the output request packet memory are absent in the drawing output unit, controlling the writing of the packet read out from the output request packet memory into the output hold packet memory.

* * * * *